United States Patent
Mohammed et al.

(10) Patent No.: US 12,554,874 B2
(45) Date of Patent: Feb. 17, 2026

(54) SYSTEMS AND METHODS FOR RESPONSIBLE AI

(71) Applicant: Fractal Analytics Private Limited, Mumbai (IN)

(72) Inventors: Akbar Mohammed, Mumbai (IN); Sagar Shah, Jersey City, NJ (US); Sray Agarwal, London (GB)

(73) Assignee: Fractal Analytics Private Limited, Mumbai (IN)

( * ) Notice: Subject to any disclaimer, the term of this patent is extended or adjusted under 35 U.S.C. 154(b) by 295 days.

(21) Appl. No.: 18/314,771

(22) Filed: May 9, 2023

(65) Prior Publication Data

US 2024/0202351 A1    Jun. 20, 2024

(30) Foreign Application Priority Data

Dec. 15, 2022    (IN) .............................. 202221072640

(51) Int. Cl.
*G06F 21/62*    (2013.01)
*G06F 8/60*    (2018.01)

(52) U.S. Cl.
CPC ............ *G06F 21/6218* (2013.01); *G06F 8/60* (2013.01)

(58) Field of Classification Search
CPC ..... G06F 21/6218; G06F 21/6245; G06F 8/60
See application file for complete search history.

(56) References Cited

U.S. PATENT DOCUMENTS

| | | | |
|---|---|---|---|
| 11,977,836 B1* | 5/2024 | Archambeau | G06F 16/3329 |
| 2021/0174168 A1* | 6/2021 | Dalli | G06N 3/0495 |
| 2021/0232940 A1* | 7/2021 | Dalli | G06N 3/042 |
| 2022/0121884 A1* | 4/2022 | Zadeh | G06N 3/006 |
| 2022/0172050 A1* | 6/2022 | Dalli | G06N 3/098 |
| 2022/0179955 A1* | 6/2022 | Yi | G06N 3/08 |
| 2022/0198254 A1* | 6/2022 | Dalli | G06N 3/094 |
| 2022/0301658 A1* | 9/2022 | Zamft | G16B 40/00 |
| 2023/0114826 A1* | 4/2023 | Donovan | G06Q 10/06393 706/11 |
| 2023/0164162 A1* | 5/2023 | Lee | G06N 5/045 726/23 |
| 2023/0280495 A1* | 9/2023 | Vos | G06N 3/045 702/3 |
| 2023/0351242 A1* | 11/2023 | Ezrielev | G06N 5/01 |
| 2024/0005643 A1* | 1/2024 | Suzuki | G16H 20/40 |
| 2024/0013525 A1* | 1/2024 | Lim | G06V 10/774 |
| 2024/0064068 A1* | 2/2024 | Nanduru | H04L 41/5006 |
| 2024/0127110 A1* | 4/2024 | Ezrielev | G06N 5/01 |
| 2024/0202351 A1* | 6/2024 | Mohammed | G06F 21/6218 |

* cited by examiner

*Primary Examiner* — Gary S Gracia
(74) *Attorney, Agent, or Firm* — Wiley Rein LLP

(57) ABSTRACT

Systems and methods for responsible artificial intelligence (AI) may provide an end-to-end framework from defining what responsible behavior and guidance are to the components that developers can leverage to detect and measure bias. API components may be provided at the model training and deployment stage to mitigate bias. Deployed components may then be linked to fairness monitoring APIs in a machine learning operations framework to integrated in the enterprise.

8 Claims, 8 Drawing Sheets

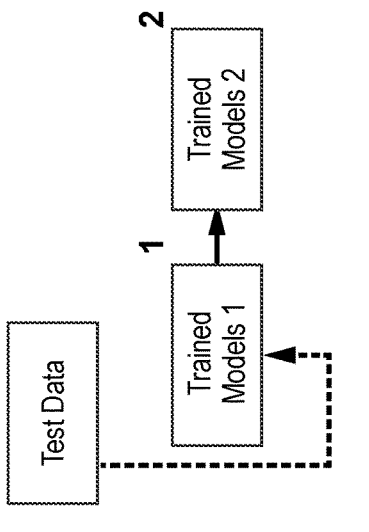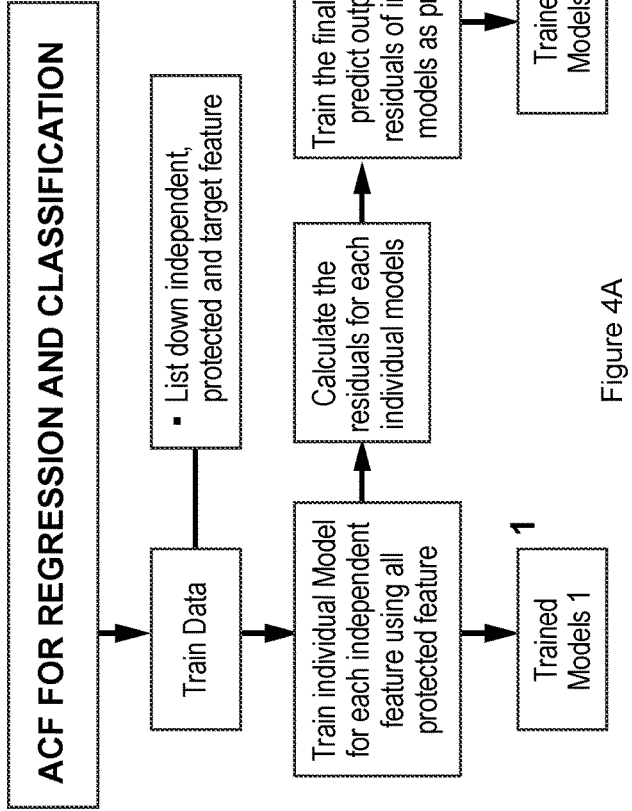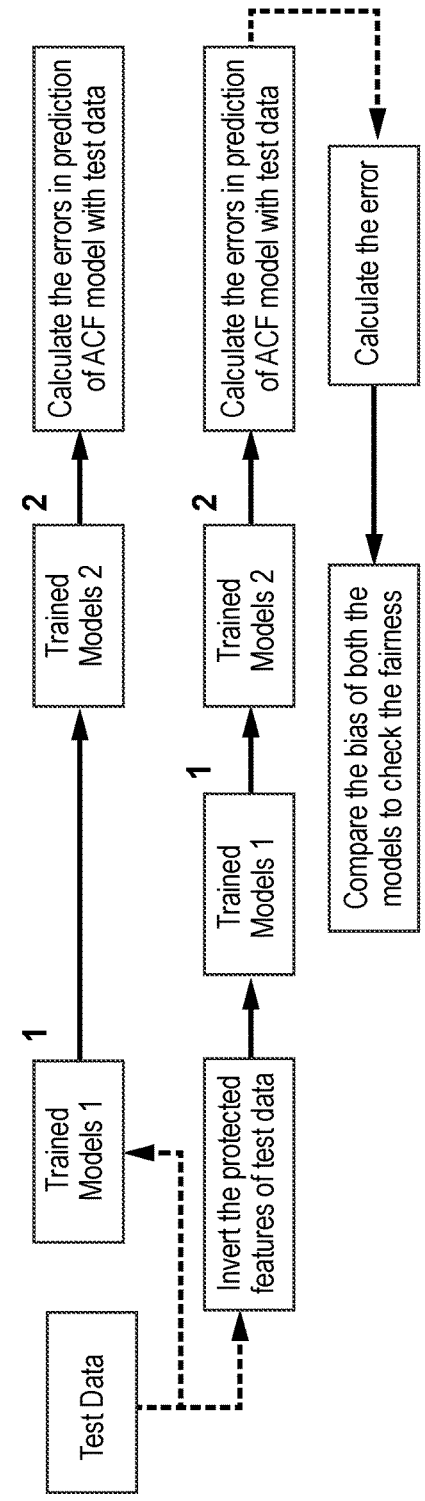

SYSTEMS AND METHODS FOR RESPONSIBLE AI

FIELD OF THE DISCLOSURE

The present disclosure generally relates to responsible artificial intelligence (AI), and more particularly to systems and methods to detect and mitigate discrimination for supervised learning use cases and/or protected and/or proxy-protected features.

BACKGROUND

Bias in certain sensitive or protective attributes is often evaluated independently at specific stages of the machine learning development. Along with bias, developers evaluate fairness of a model through a range of statistical measures depending on the context of the problem and the issue in the dataset. There are fragmented approaches to solve for bias and fairness issues. Currently, the evaluation of fairness may be performed through human-centered artificial intelligence (AI) to define the problem and risk analysis index (RAI) to align stakeholders and decision outcomes and evaluate fairness and bias for varying use cases. However, human-centered design and developer guidance can be limited in scope. The AI developer may be expected to build or borrow some open-source components to create their own service to solve a range of responsible AI issues. Leveraging multiple open source components add complexity in deployed systems to tackle responsible AI challenges and increase the risk of failure and misdiagnosis. There is a lack of agnostic solutions across domains.

SUMMARY

Embodiments of the present disclosure may provide systems and methods to address the problem of unethical practice using a plurality of fairness methodologies to detect and mitigate discrimination for various supervised learning use cases, and all kinds of protected features, and all kind of proxy-protected features. Systems and methods according to embodiments of the present disclosure may provide for transparency and explainability of models, data, counterfactuals, and model risk. In a monitoring context, systems and methods according to embodiments of the present disclosure may detect concept drifts, data drifts, and/or fairness drifts. In addition, systems and methods according to embodiments of the present disclosure may provide privacy detection and mitigation in connection with data, models, synthetic data, and/or fed learning. Systems and methods according to embodiments of the present disclosure also may assist in fraud detection. Systems and methods according to embodiments of the present disclosure also may be utilized in connection with risk analysis index (RAI), such as behavioral science-based RAI as well as in canvas and implementation approaches. In other embodiments of the present disclosure, systems and methods may be utilized in connection with AI-based environmental, social and governance (ESG) reporting and scoring.

Embodiments of the present disclosure may provide an end-to-end method for responsible artificial intelligence (AI) comprising: in a data privacy step, inputting data; in a data bias step, conducting exploratory data analysis (EDA), pre-processing to identify missing or incomplete records, outliers and anomalies, and feature engineering and selection on the data; in an explainable artificial intelligence (XAI) and privacy step, developing a model; in a model bias and privacy step, evaluating and selecting the model; evaluating prediction bias of the model; deploying the model; and following deployment, monitoring the model to evaluate bias, XAI, and drifts. The method also may comprise in a model accountability step, managing the model before deployment. Following the monitoring step, the method may include selectively returning to the defining or data bias step to further refine the model. The data bias step also may comprise selecting one or more sensitive features; conducting bias measurement; and if bias is detected, performing data debiasing. The evaluating prediction bias of the model step may further comprise selecting one or more sensitive features, conducting model debiasing; and measuring bias. The model debiasing step may occur following in-processing or post-processing. The monitoring step may further comprise evaluating if bias is detected; and if no bias is detected in the evaluating step, confirming model privacy, resulting in a fair and secure model. The model privacy may be confirmed through one or more of the following: bias and fairness drift, model monitoring, data drift, and/or model drift.

Other embodiments of the present disclosure may provide an end-to-end platform for responsible artificial intelligence (AI) implemented on one or more hardware computer processors and one or more storage devices, the platform comprising: an input database capable of receiving data; a data bias system wherein the data bias system is configured to execute code in order to cause the system to; conduct exploratory data analysis (EDA); pre-process the data to identify missing or incomplete records, outliers and anomalies; and perform feature engineering and selection on the data; a model development system wherein the model development system is configured to execute code in order to cause the system to: develop a model through explainable artificial intelligence (XAI) and privacy; evaluate the model for bias and privacy; and evaluate prediction bias of the model; and a unified model monitoring platform (UMMP) wherein the UMMP is configured to execute code in order to cause the UMMP to: monitor the model to evaluate bias, XAI, and drifts. The data bias system may be further configured to execute code in order to cause the system to: select one or more sensitive features; conduct bias measurement; and if bias is detected, perform data debiasing. When the model development system evaluates prediction bias, the model development system may be further configured to execute code in order to cause the system to: select one or more sensitive features; conduct model debiasing; and measure bias. The model debiasing step may occur following in-processing or post-processing. The UMMP may be further configured to execute code in order to cause the system to: evaluate if bias is detected; and if no bias is detected in the evaluating step, confirm model privacy, resulting in a fair and secure model. Model privacy may be confirmed through one or more of the following: bias and fairness drift, model monitoring, data drift, and/or model drift. The UMMP may further comprise a model deployment layer; a gateway layer that provides access to the data through an application programming interface (API) or an event stream; a risk analysis index (RAI) services layer including a plurality of independent microservices; a RAI APIs layer that provides access to the RAI services layer to extract RAI details for the model, generate a model benchmark report, subscribe to violation notifications, and get the model in production; and a RAI user interface layer that provides a browser-based interface and includes at least an RAI dashboard, report generation, monitoring, and administration. Decisions and feature stores may be included in the model deployment layer. The plurality of microservices may be selected from the group comprising: fairness lens, model benchmark, model explainer, bias detector, privacy violations, and/or drift detector. The RAI services layer may further comprise an RAI registry. The UMMP may further comprise security through role-based access control (RBAC) to provide token-based authentication and authorization services across each of the RAI Services, RAI APIs, and RAI user interface layers. The UMMP also may comprise API management; continuous integration/continuous delivery (CI/CD); and third-party integration to validate personally identifiable information (PII) data across each of the RAI Services, RAI APIs, and RAI user interface layers.

BRIEF DESCRIPTION OF THE DRAWINGS

For a more complete understanding of this disclosure, reference is now made to the following description, taken in conjunction with the accompanying drawings, in which:

FIGS. 4A-4C depict use of train data and test data using ACF for regression and classification according to an embodiment of the present disclosure;

DETAILED DESCRIPTION

Figure 1:
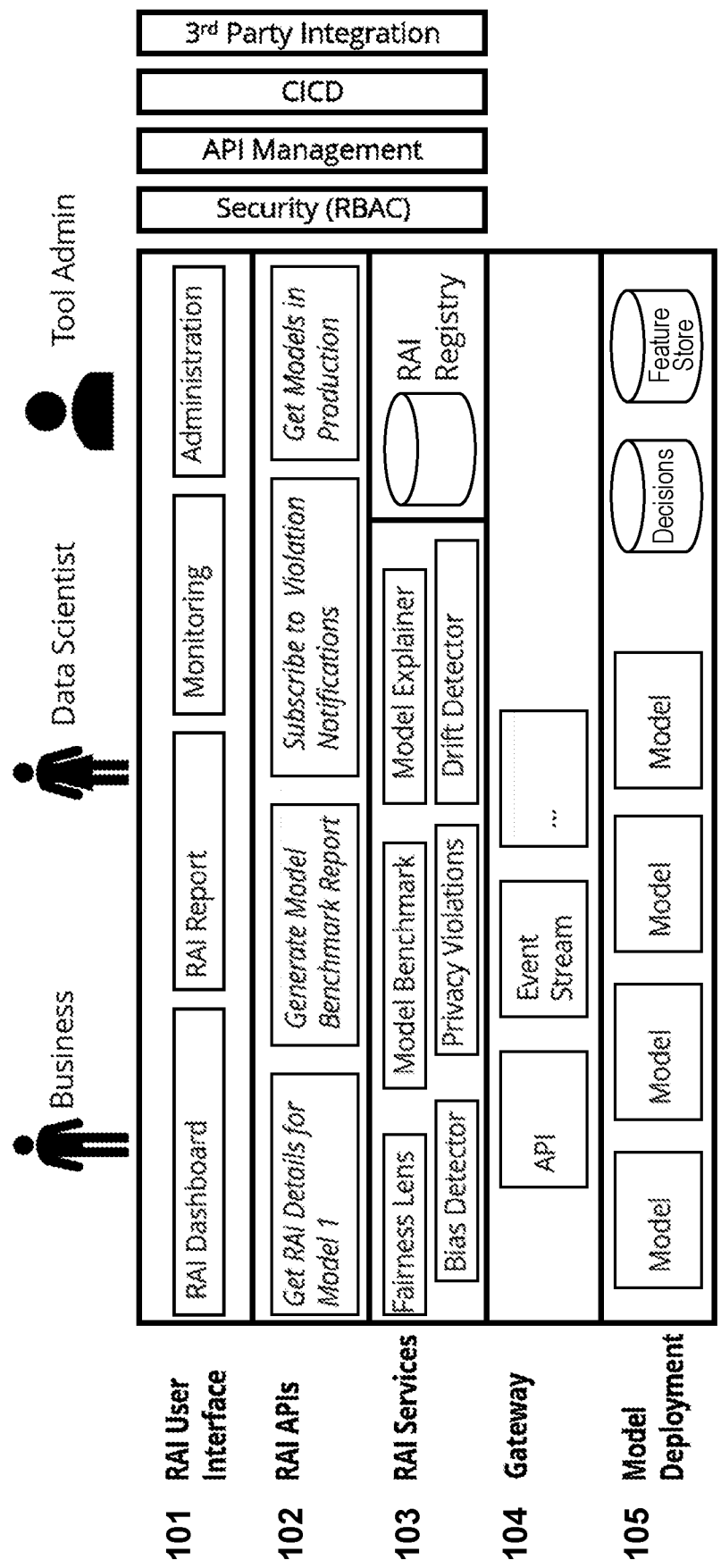
FIG. 1 depicts an architectural diagram for UMMP according to an embodiment of the present disclosure.

It should be understood that this disclosure is not limited to the particular methodology, protocols, and systems, etc., described herein and as such may vary. The terminology used herein is for the purpose of describing particular embodiments only and is not intended to limit the scope of the present disclosure, which is defined solely by the claims.

As used in the specification and appended claims, unless specified to the contrary, the following terms have the meaning indicated below.

"Responsible AI" or "RAI" refers to a capability for organizations that addresses the gap in making the AI systems more transparent, reliable and interpretable so that organizational and societal issues of fairness, bias, legal compliance and ethics can be addressed methodically. RAI is about ensuring that models are fair and unbiased.

"Differential privacy" refers to a system for publicly sharing information about a dataset by describing the patterns of groups within the dataset while withholding information about individuals in the dataset. If the effect of making an arbitrary single substitution in the database is small enough, the query result cannot be used to infer much about any single individual, and therefore provides privacy. The promise of differential privacy (more precisely, ε-differential privacy) is to provide a measurable way to balance privacy and data accuracy when publicly releasing aggregate data on private datasets.

"Machine learning library" or "ML Library" refers to a compilation of functions and routines readily available for use. This collection of prewritten code that programmers can use to optimize tasks. This collection of reusable code is usually targeted for specific common problems. A library usually includes a few different pre-coded components.

"Epsilon (ε)" refers to a metric of privacy loss at a differentially changed data. Epsilon parameter is input and adds random noise to values in the original dataset, proportionally to the given ε parameter. Thus, the smaller the epsilon value, the more noise will be added to the values, the better privacy protection.

"Exploratory data analysis" or "EDA" refers to an approach of analyzing data sets to summarize their main characteristics, often using statistical graphics and other data visualization methods.

"Data pre-processing" refers to a process of transforming raw data so that data scientists and analysts can run it through machine learning methodologies to uncover insights or make predictions. It may handle missing or incomplete records, outliers and anomalies, and feature engineering (creation).

"Train/Test split" refers to a method to measure the accuracy of a model. Data may be split into two sets, a training set and a testing set. The model is trained using the training set—a set of examples used to fit the parameters. The model is tested using the testing set that is used to provide an unbiased evaluation of a final model fit on the training data set.

"Precision" refers to a class specific performance metric which is applied when class distribution is imbalanced (one class is more frequent than others). Precision=#samples correctly predicted a target/#samples predicted as target.

"Recall" refers to a fraction of samples from a class which are correctly predicted by the model. Recall=True_Positive/(True_Positive+False_Negative).

"F1-score" refers to combining the precision and recall of a classifier into a single metric by taking their harmonic mean.

"Accuracy" refers to quality benchmark used in classification tasks and may be a number of correct predictions divided by the total number of predictions.

"Sensitive feature or protected variable" refers to attributes like age, color, marital status, national origin, race, religion, gender, etc. that is about an individual.

"Independent variable" refers to variables included in the model to explain or predict changes in the dependent variable. These variables stand-alone and other variables in the model do not influence them. It describes to an observation that correlates closely to another variable and can therefore be used to predict its value through an AI model. These also may be called predictors.

"Target variable/dependent variable" refers to variables you want to use the model to explain or predict. The values of this variable depend on other variables. It is also known as the response variable or the outcome variable.

"Bias" refers to the amount that a model's prediction differs from the target value, compared to the training data. Bias may occur when results are produced that are systemically prejudiced due to erroneous assumptions in the machine learning process.

"Model" refers to a machine learning (ML) model or an artificial intelligence (AI) model that is trained on a set of data to perform specific tasks and apply that learning to achieve a pre-defined objective.

"Evaluation metrics" refers to statistical metrics or formulas used to access the goodness of the model. They may be used to quantify the accuracy, error, and other complex metrics to justify if the model is fit to use or if is it bad.

"Fairness metrics" refer to the mathematical definition of "fairness" that is measurable. Some commonly used fairness metrics include equalized odds, predictive parity, and demographic parity. Many fairness metrics are mutually exclusive.

"Fairness" refers to a measure to ensure that decisions guided by models are equitable and free from any sort of biases either through inappropriate design or by implicitly encoding biases in the data on which they are built.

"ACF Model" refers to a model that assumes that the counterfactual probabilities of two individuals choosing from either group should be the same with respect to a given (non-sensitive) feature to mitigate bias by fair selection.

"Bias mitigation" refers to a technique to remove the riskiest functionality, provide mindful friction, and guide people on the responsible use of AI. This can be done by monitoring and controlling how a system is being used and disabling it when harm is detected.

"Residual" refers to the differences between observed and predicted values of data.

"Trained Model," also referred to as a general ML model, is an AI model that is trained on a set of data to perform specific tasks and apply that learning to achieve pre-defined objective. These trained models are directly used in production.

"Trained Model 1" refers to a set of individual ML models developed for all features separately regressing all protected features.

"Trained Model 2" refers to a model developed to predict the final outcome regressing it with residuals/errors of Trained Model 1.

"Error" refers to a data point that an AI model classifies incorrectly. Error is used to see how accurately a model can predict data it uses to learn as well as new, unseen data. Based on error, the machine learning model may be chosen which performs best for a particular dataset.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Embodiments of the present disclosure may provide an end-to-end process and framework that may define what responsible behavior and guidance are to the actual components that developers can leverage to detect and measure bias. Additionally, developers may be provided with application programming interface (API) components to mitigate bias at the model training and deployment stage. Further, deployed components may be linked to fairness monitoring APIs in a machine learning operations (MLOPs) governance framework to be integrated in an enterprise in an embodiment of the present disclosure.

Systems and methods according to embodiments of the present disclosure may incorporate behavioral science-driven surveys and checklist-based nudges and APIs to embed bias detection, mitigation, and monitoring. Fairness measurement may occur through visualized front ends to drive decision-making for the business user and key auditing stakeholders. A design canvas may be provided to define responsible AI practices. Behavioral nudges may be incorporated to check for ethical issues in AI development. Components may be built on a microservices architecture so that they may be deployable in cloud-agnostic infrastructure. Bias may be detected using over a plurality of statistical measures with flexible thresholds. Systems and methods also may incorporate embedded privacy-enhancing technology and may mitigate bias in data processing, model processing, and/or model monitoring. Pre-modelling, re-weighting, and/or in-modelling also may be provided. Reward and penalty-based regularizers may be employed along with additive counterfactual fairness, adversarial debiasing, post modelling, and/or decision threshold optimization for classification in embodiments of the present disclosure. Model agnostic explainability modules may be optimized for large-scale models. Monitoring for bias and fairness in deployed models also may be provided.

With increased use of artificial intelligence/machine learning in enterprises, it becomes challenging to manage the large number of models being deployed on different platforms in multi-cloud environments and edge devices. Models need to be monitored for data drift, biases in output, privacy violations, among other things. A unified model monitoring platform (UMMP) may provide centralized visibility into all of the models in production so that users may take corrective measures based on the models. This platform may provide a single pane of glass to view the health of models, including detection for violation of responsible AI principles. UMMP interfaces with model deployment platform(s) to gather model related data such as model output, features, performance metrics. Collected data is processed by various services such as Fairness Lens, Drift Detector, Privacy Violations to arrive at model health. Users access the platform using a web-based interface for viewing the dashboard, generating reports etc. Platform can be extended to provide value-added services such as model benchmarking.

FIG. 1 depicts an architectural diagram for UMMP according to an embodiment of the present disclosure. In FIG. 1, various layers are depicted. The bottom layer 105 (Model Deployment) reflects how models may be deployed in variety of ways, including but not limited to, services, batch on different platforms (ex. AWS SageMaker), and/or across multiple cloud providers. Decisions and feature stores also may be included in this layer in an embodiment of the present disclosure. A second layer 104 (Gateway) may provide access to data including, but not limited to, model output, model metrics, and/or feature store. Data translation and security services also may be provided through this layer in embodiments of the present disclosure. As depicted in FIG. 1, data can be accessed through at least APIs or event streams. However, other methods of data access may be employed in this layer without departing from the present disclosure. A third layer 103 (RAI Services) may include a plurality of loosely coupled, independent microservices implementing different functionalities for processing model-related data for a particular aspect, such as fairness. Microservices may include, but are not limited to, Fairness Lens, Model Benchmark, Model Explainer, Bias Detector, Privacy Violations, and/or Drift Detector. An RAI Registry also may be housed in the RAI Services layer 102 in an embodiment of the present disclosure. The RAI APIs layer 101 may provide access to RAI Services including but not limited to getting RAI details for a model, generating a model benchmark report, subscribing to violation notifications (which may be provided through a plurality of different channels including, but not limited to, email and push notification to inform users about anomalies), and/or getting models in production. This layer also may implement security, access control and other API Management functionality in embodiments of the present disclosure. The RAI User Interface layer may provide intuitive and rich browser-based interface to underlying functionality and report generation. This layer may include an RAI Dashboard, RAI Report, monitoring, and/or administration in embodiments of the present disclosure. The layers may be accessible by a business, a data scientist, and/or a tool admin in embodiments of the present disclosure. Security, such as through role-based access control (RBAC) may provide token-based authentication and authorization services across the RAI Services, RAI APIs, and RAI User Interface layers in embodiments of the present disclosure. API Management, continuous integration/continuous delivery (CI/CD), and/or third-party integration (i.e., validating personally identifiable information (PII) data rather than managing an internal repository) also may be provided across the RAI Services, RAI APIs, and RAI User Interface layers in embodiments of the present disclosure.

Figure 2:
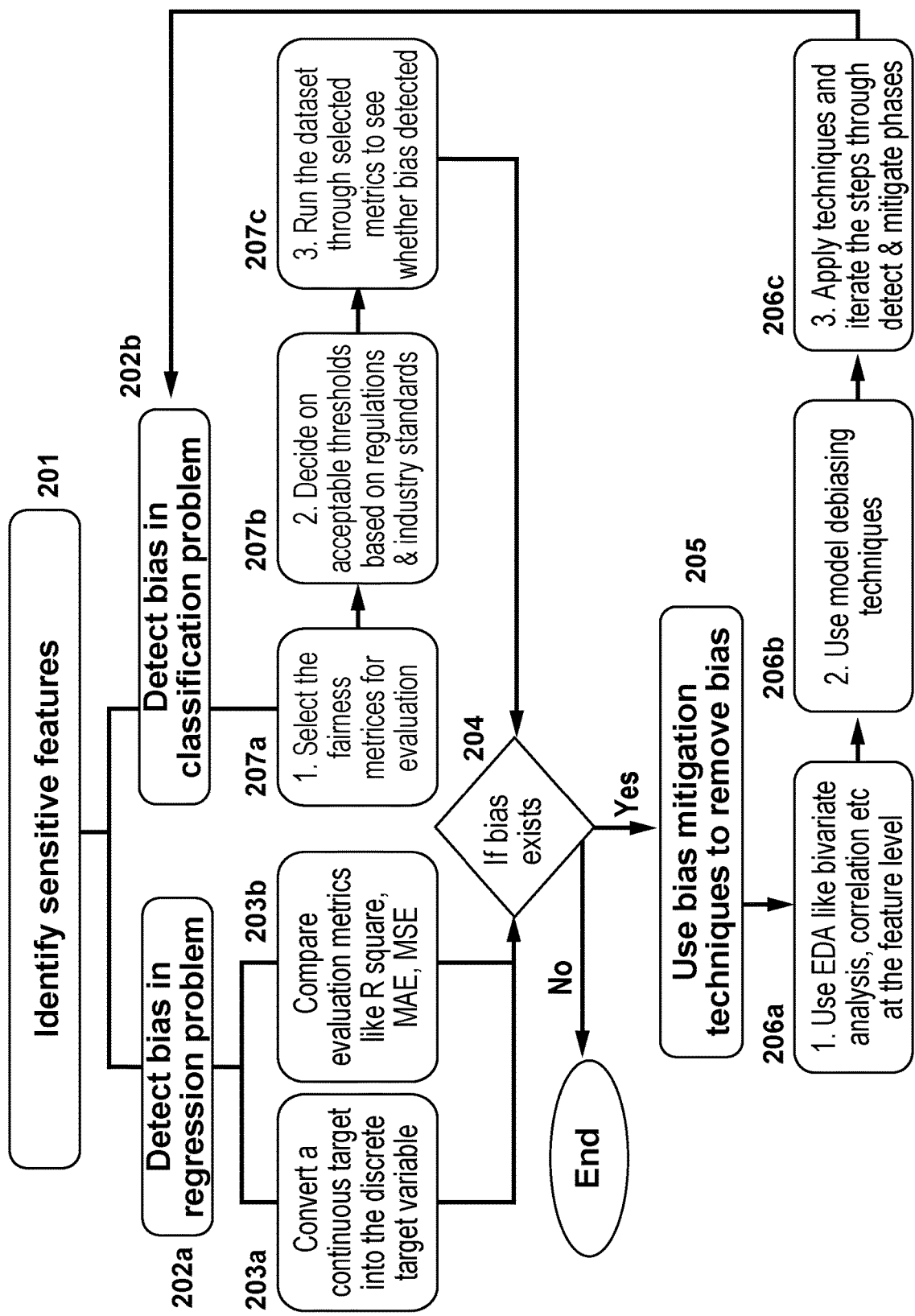
FIG. 2 depicts a fairness detection and mitigation framework according to an embodiment of the present disclosure.

FIG. 2 depicts a fairness detection and mitigation framework according to an embodiment of the present disclosure. In step 201, identifying one or more sensitive features. Sensitive features, which also may be referred to as protected variables, may include attributes including, but not limited to, age, color, marital status, national origin, race, religion, and/or gender that are about an individual. Lenders or credit underwriters need to ensure that sensitive features/protected variables are not being used in machine learning models to ensure fairness in lending.

In step 202*a*, bias in the regression may be detected. As described herein, bias may be the amount that a model's prediction differs from a target value compared to the training data (i.e., results produced that may be systemically prejudiced due to erroneous assumptions in the machine learning process). This may include converting a continuous target into the discrete target variable (step 203*a*) or comparing evaluation metrics to quantify the accuracy, error, or other metrics to justify if the model is fit to use or is bad including but not limited to, root mean square error (R square), mean absolute error (MAE), and mean square error (MSE) (step 203*b*). The target variable (or dependent/response/outcome variable) may be considered what the model may be used to explain or predict. The values of this variable depend on other variables. An evaluation as to whether bias exists may be performed in step 203. If no bias exists, the process ends. If bias exists, bias mitigation techniques may be used to remove bias in step 205. Bias mitigation may remove the riskiest functionality, provide mindful friction, and guide people on the responsible use of AI by monitoring and controlling how a system is being used and disabling it when harm is detected. Exploratory data analysis (EDA), such as bivariate analysis and/or correlation, may be performed at the feature level (step 206*a*), model debiasing techniques may be used (step 206*b*), and techniques may be applied to iterate the steps through the detect and mitigation steps described in steps 202, 203, 204, 205 (step 206*c*).

Step 202*b* provides for detecting a bias in the classification. This may include selecting the fairness metrics for evaluation (step 207*a*), deciding on acceptable thresholds based on regulations and industry standards (step 207*b*), and running the dataset through selected metrics to see whether bias is detected (step 207*c*). Fairness metrics may include, but are not limited to, equalized odds, predictive parity, and/or demographic parity. An evaluation as to whether bias exists may be performed in step 203. If no bias exists, the process ends. If bias exists, bias mitigation techniques may be used to remove bias in step 205. Exploratory data analysis (EDA), such as bivariate analysis and/or correlation, may be performed at the feature level (step 206*a*), model debiasing techniques may be used (step 206*b*), and techniques may be applied to iterate the steps through the detect and mitigation steps described in steps 202, 203, 204, 205 (step 206*c*).

Figure 3:
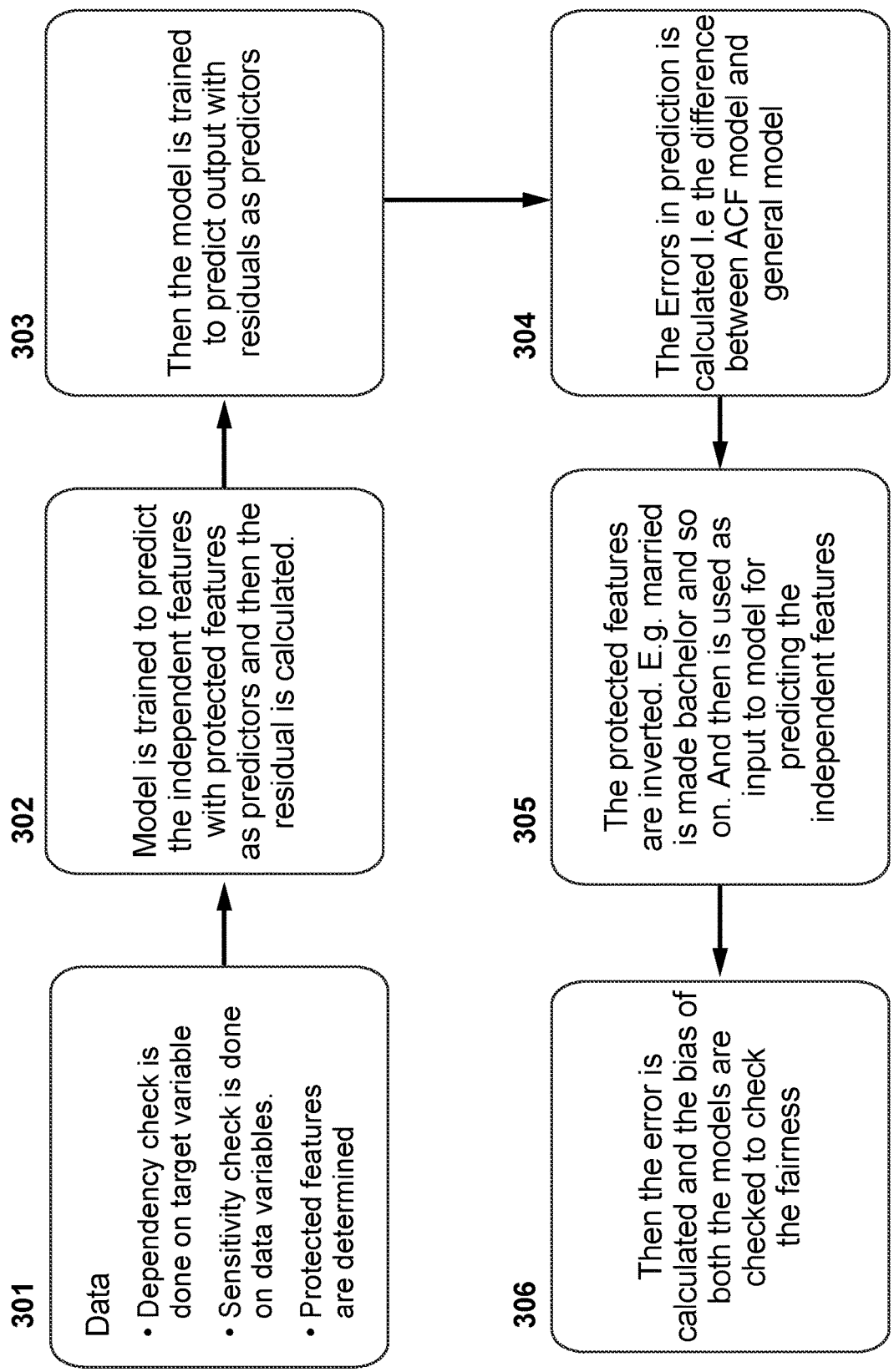
FIG. 3 depicts a method of autocorrelation function (ACF) for regression and classification according to an embodiment of the present disclosure.

FIG. 3 depicts a method of autocorrelation function (ACF) for regression and classification according to an embodiment of the present disclosure. The ACF model may assume that the counterfactual probabilities of two individuals choosing from either group should be the same with respect to a given (non-sensitive) feature to mitigate bias by fair selection. In step 301, for data, determining a dependency on a target variable may occur. A sensitivity check may be done on data variables, and protected features may be determined. In step 302, training a model may predict the independent features with protected features as predictors, and the residual may be calculated. The residual may be defined as differences between observed and predicted values of data. In step 303, training the model to predict output with residuals as predictors. In step 304, calculating at least one error in prediction (i.e., the difference between the ACF model and the general model). Errors may be considered data points that an AI model classifies incorrectly. Error may be used to see how accurately the model can predict data it uses to learn as well as new, unseen data. For example, in a loan approval model used by a bank, the model may give more errors to individuals who are younger and have a low monthly average balance with the bank. Based on the error, the machine learning model may be chosen which performs best for a particular dataset. In step 305, the protected features may be inverted (e.g., married converted to single) and then used as an input to the model for predicting the independent features (i.e., variables included in the model to explain or predict changes in a dependent variable). In step 306, the error may be calculated, and the bias of both models may be checked to check the fairness.

FIGS. 4A-4C depict use of train data and test data using ACF for regression and classification according to an embodiment of the present disclosure. In FIG. 4A, using ACF for regression and classification, training data which may provide a list of independent, protected, and target features. The individual model may be trained for each independent feature using all protected features, resulting in Trained Models 1. In general, a machine learning model is an AI model trained on a set of data to perform specific tasks and apply that learning to achieve a predefined objective. Trained models may be directly used in production. Trained Model 1 may be a set of individual machine learning models developed for all features separately regressing all protected features. The residuals for each individual model may be calculated, the final model may be trained to predict the output with residuals of individual models as predictors, resulting in Trained Models 2. Trained Model 2 may be a model developed to predict the final outcome regressing it with residuals/errors of Trained Model 1. In FIG. 4B, test data may be fed into Trained Models 1 and then to Trained Models 2. In FIG. 4C, after the test data is fed into Trained Models 1 and then to Trained Models 2, errors in prediction of the ACF model with test data may be calculated. Using the test data, the protected features of test data may be inverted to move into Trained Models 1 and then to Trained Models 2. The errors in prediction of ACF model with test data may be calculated, error may then be calculated, and the bias of both models may be compared to check the fairness. Fairness is a measure to ensure that decisions guided by models are equitable and free from any sort of biases either through inappropriate design or by implicitly encoding biases in the data on which they are built.

Figure 5:
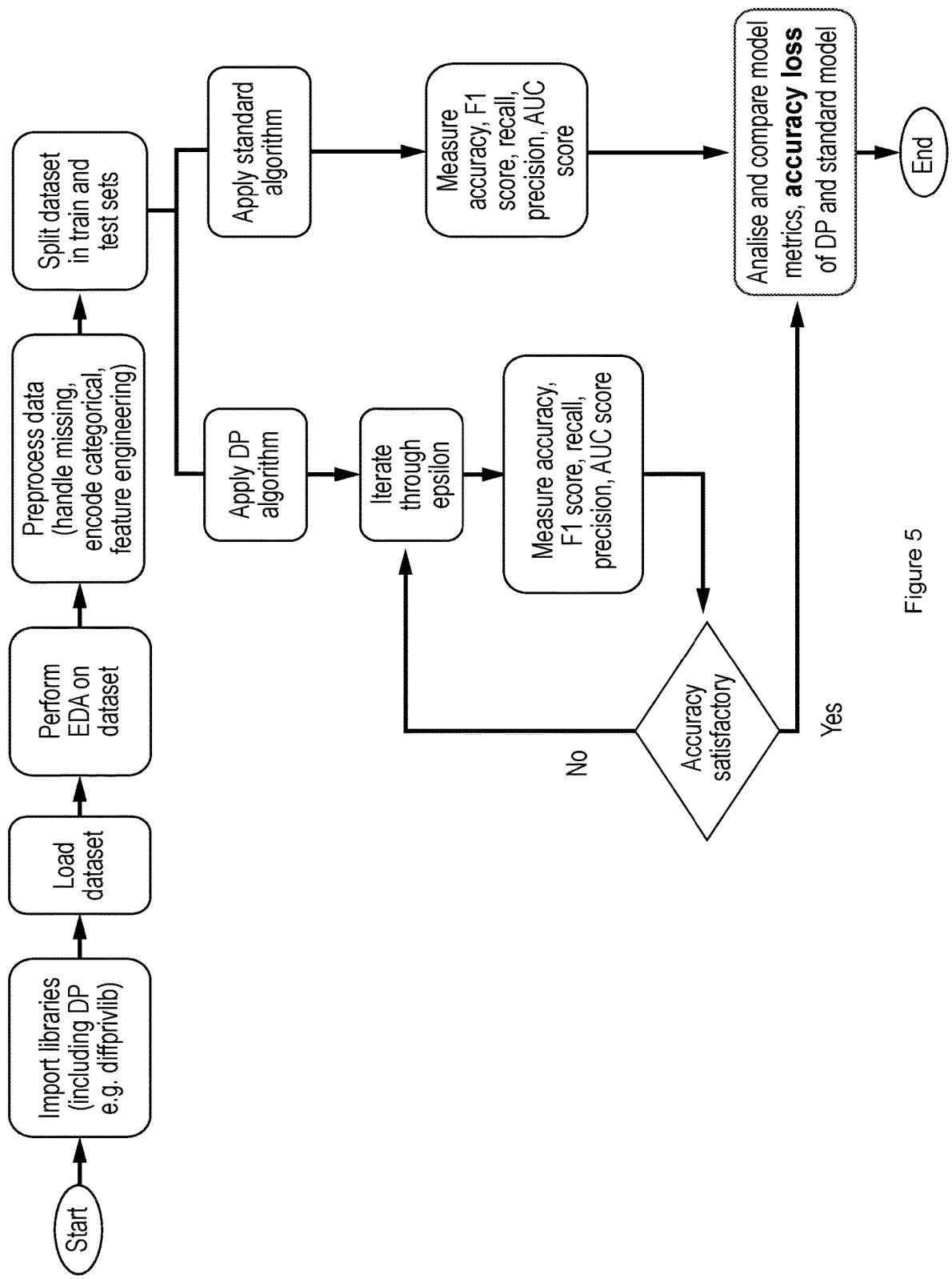
FIG. 5 depicts a method of differential privacy according to an embodiment of the present disclosure.

FIG. 5 depicts a method of differential privacy according to an embodiment of the present disclosure. Differential privacy is a system for publicly sharing information about a dataset by describing the patterns of groups within the dataset while withholding information about individuals in the dataset. With differential privacy, if the effect of making an arbitrary single substitution in the database is small enough, the query result cannot be used to infer much about any single individual, and therefore, provides privacy. Differential privacy may provide a measurable way to balance privacy and data accuracy when publicly releasing aggregate data on private datasets.

Figure 6:
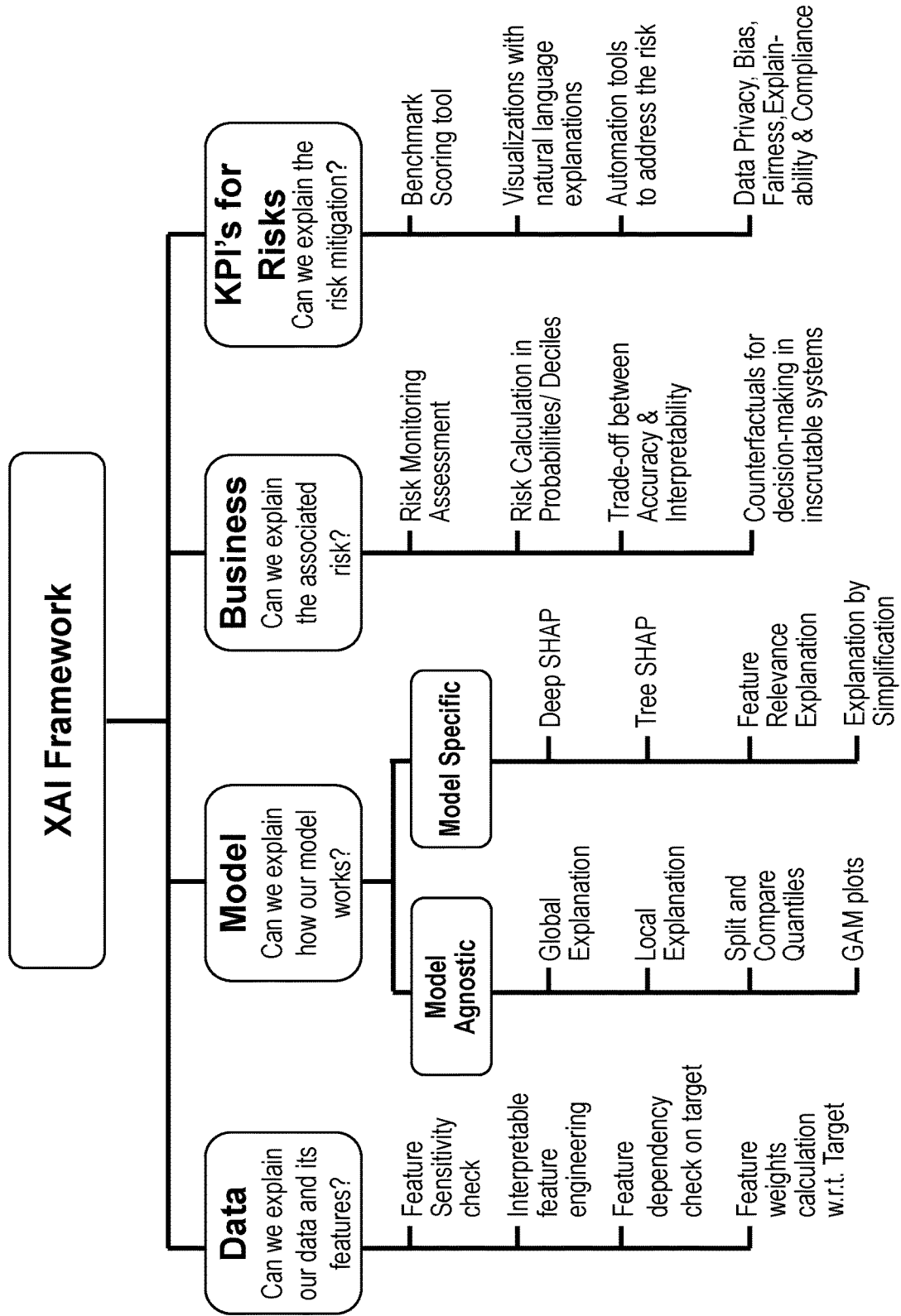
FIG. 6 depicts an explainable artificial intelligence (XAI) framework according to an embodiment of the present disclosure.

FIG. 6 depicts an explainable artificial intelligence (XAI) framework according to an embodiment of the present disclosure. The XAI framework may involve data, model, business, and KPIs for risk. More specifically, with data, the question is whether the data and its features can be explained. This may include, but is not limited to, feature sensitivity check, interpretable feature engineering, feature dependency check on target, and/or feature weights calculation with respect to target. With the model, the question is whether how the model works can be explained. A model agnostic scenario may include, but is not limited to, global explanation, local explanation, split and compare quantities, and/or generalized additive model (GAM) plots. A model specific scenario may include deep explainer (deep SHAP), tree SHAP, feature relevance explanation, and/or explanation by simplification. In the business, the question is whether the associated risk can be explained and may include, but is not limited to, risk monitoring assessment, risk calculation in probabilities/deciles, trade-off between accuracy and interpretability, and/or counterfactuals for decision-making in inscrutable systems. With KPIs for risks, the question presented is whether the risk mitigation can be explained and may include, but is not limited to, benchmark scoring tool, visualizations with natural language explanations, automation tools to address risk, and/or data privacy, bias, fairness, explainability, and/or compliance.

Libraries including differential privacy (e.g., diffprivlib) may be imported. The dataset may be loaded, and exploratory data analysis (EDA) may be performed on the dataset. EDA may analyze datasets to summarize their main characteristics, often using statistical graphics and other data visualization methods. Data may then be preprocessed such as to handle missing or incomplete data, records, outliers, and anomalies, encode categories, and perform feature engineering. Data preprocessing may transform raw data so that it may be run through machine learning methodologies to uncover insights or make predictions. The dataset may then be split into train and test sets. This is a method to measure accuracy of the model. Accuracy may be defined as a number of correct predictions divided by the total number of predictions. The model is trained using the training set (i.e., a set of examples used to fit the parameters). The model may be tested using the testing set to provide an unbiased evaluation of a final model fit on the training data set. Differential privacy may be applied, iterated through epsilon (a metric of privacy loss that has differentially changed or data adding random noise to values in the original dataset proportionally to the given epsilon parameter; i.e., as the epsilon value is smaller, more noise will be added to the values, and the better privacy protection), and accuracy, F1 score (combining precision and recall of a classifier into a single metric by taking their harmonic mean), recall (fraction of samples from a class which are correctly predicted by the model; True_Positive/True_Positive+False_Negative), precision (class-specific performance metric applied when class distribution is imbalanced; number samples correctly predicted a target/number of sales predicted as target), and AUC score may be measured. If the accuracy is satisfactory, the model metrics, accuracy loss of differential privacy and standard model may be analyzed and compared. If the accuracy is not satisfactory, the method may return to iteration and measurement until satisfactory. Accuracy. F1 score, recall, precision, and AUC score may be measured before analyzing and comparing model metrics, accuracy loss of differential privacy, and standard model.

Responsible artificial intelligence (AI) may address the gap in making AI systems more transparent, reliable, and interpretable so that organizational and societal issues of fairness, bias, legal compliance, and ethics can be addressed methodically. Responsible AI may ensure that models are fair and unbiased.

Figure 7:
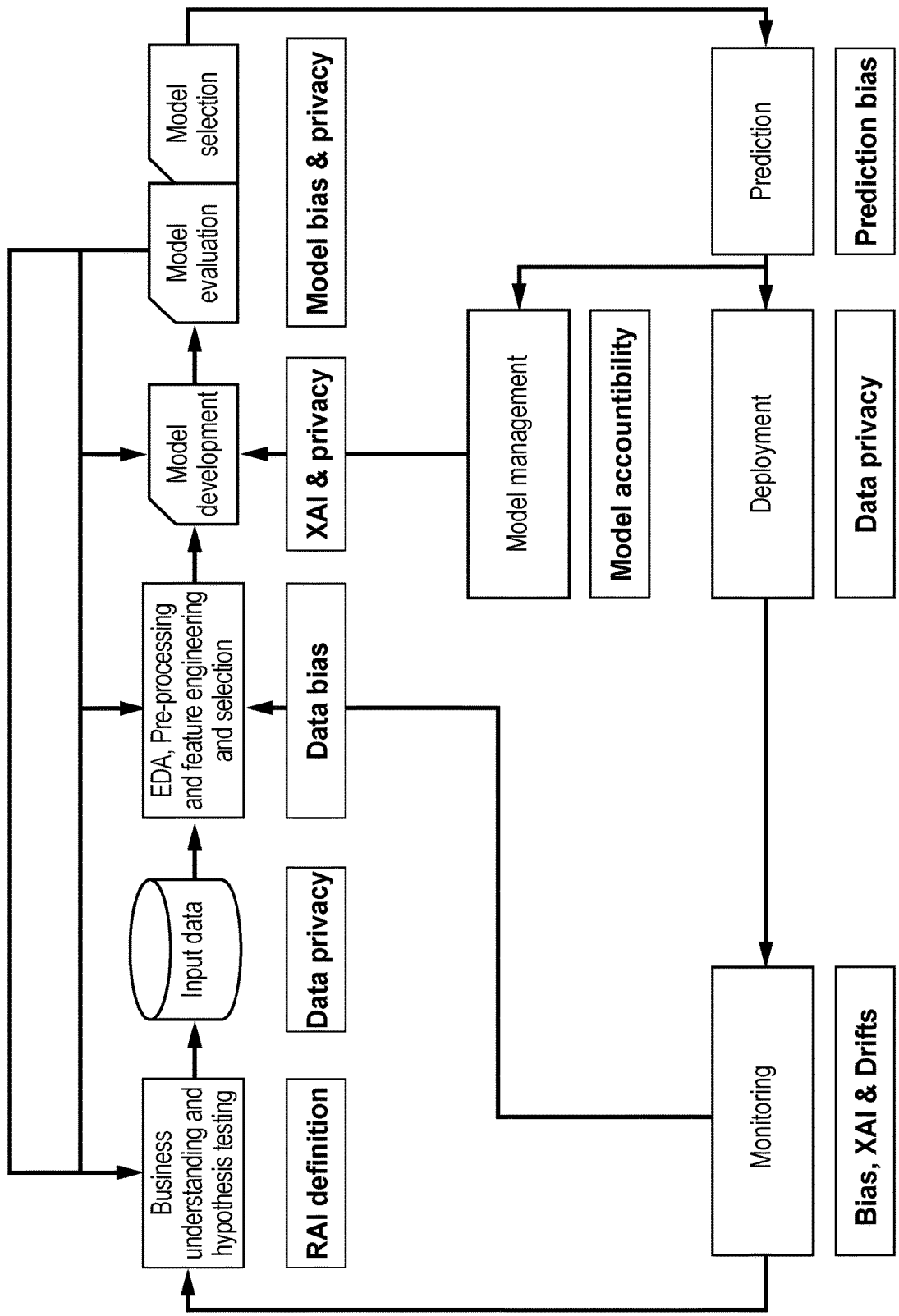
FIG. 7 depicts a system and method for responsible AI according to an embodiment of the present disclosure.

Embodiments of the present disclosure may provide systems and methods for responsible AI, such as in FIG. 7, wherein business understanding and hypothesis testing may occur in a risk analysis index (RAI) definition step. Data may be input (data privacy step). Data may be input from any data source whose data needs to be made private. EDA, pre-processing, and/or feature engineering and selection may occur (data bias step). Preprocessing may include, but is not limited to, removing empty records, removing duplicate records, filling missing records, and/or vectorization. Feature engineering may include creating new features by doing some operations on existing data (e.g., driving age date of birth or calculating percent-saving by dividing savings with total income. Feature selection may include finding out features from all features that are important and significant for a model. It should be appreciated that these steps all may be performed on a single platform in embodiments of the present disclosure; however, there may be embodiments of the present disclosure where steps may be performed on a single platform and then passed to one or more other platforms. The model may be developed (XAI and privacy step), then evaluated and selected (model bias and privacy step). There may then be a prediction bias step prior to deployment (data privacy). Also, before deployment, the model may be managed in a model accountability step wherein there may be a return to the model development, evaluation, and selection steps previously described. Upon deployment, monitoring may occur to evaluate bias, XAI and drifts. Following this monitoring, the methodology may selectively return to RAI definition or EDA, pre-processing, and feature engineering and selection to further refine the methodology.

Figure 8:
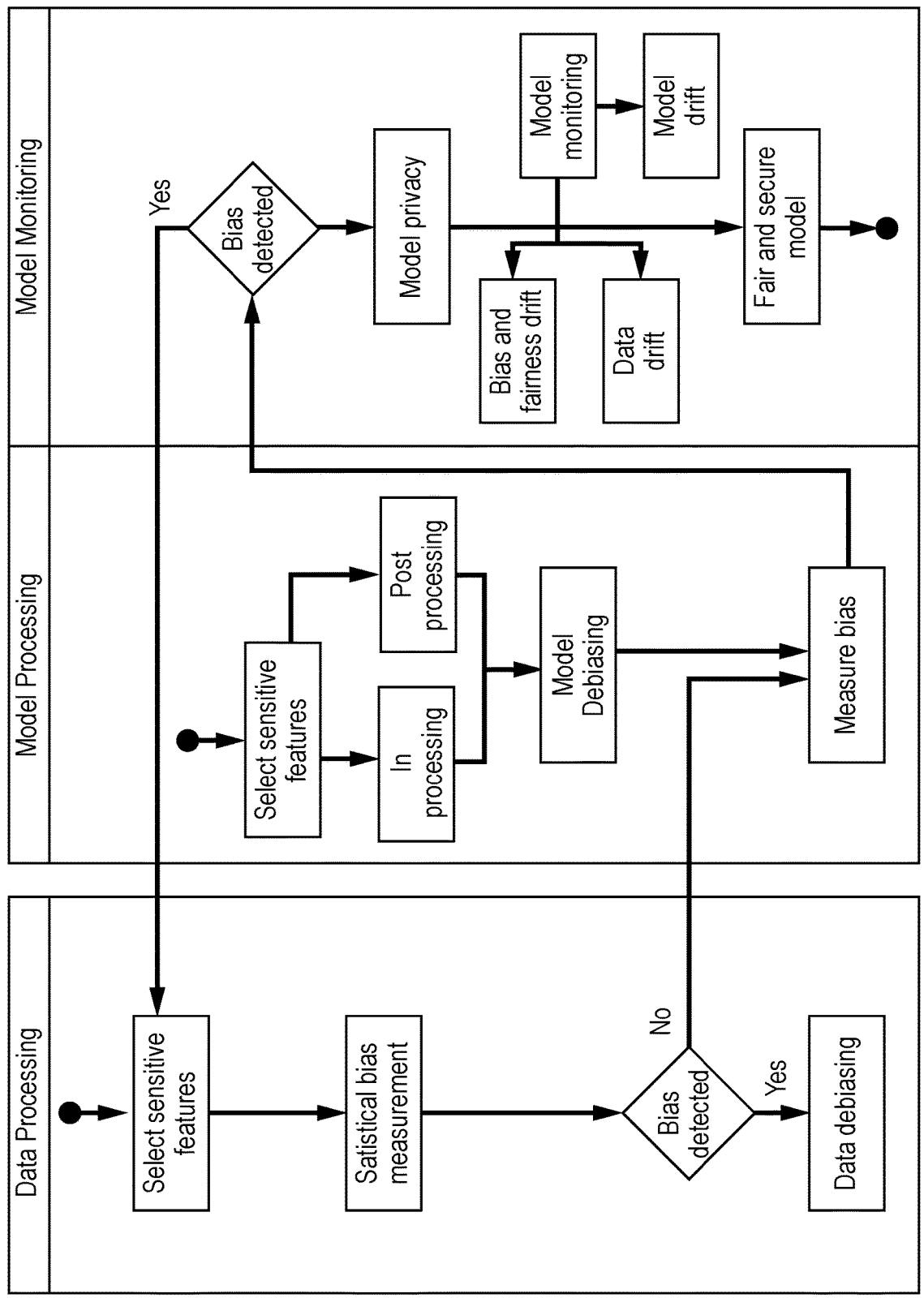
FIG. 8 depicts a framework for responsible AI according to an embodiment of the present disclosure.

FIG. 8 depicts a framework for responsible AI according to an embodiment of the present disclosure. As depicted in FIG. 8, the framework may comprise three components: data processing, model processing, and/or model monitoring. In data processing, sensitive features may be selected, and statistical bias measurement may be performed. An evaluation may be made as to whether bias is detected. If bias is detected, data debiasing may occur, and bias may be measured in the model processing component of the framework.

If no bias is detected, bias may be measured in the model processing component of the framework. In model processing, sensitive features may be selected for in-processing or post-processing. Following in-processing or post-processing, model debiasing may occur, and bias may be measured. In model monitoring, an evaluation may be made as to whether bias is detected from the bias measurement aspect of model processing. If bias is detected, the framework may return to the data processing component to select sensitive features and repeat the framework as described herein. If no bias is detected, model privacy may be evaluated including, but not limited to, bias and fairness drift, data drift, model monitoring, and/or model drift. Following this evaluation, a fair and secure model may be achieved.

Systems and methods for responsible AI according to embodiments of the present disclosure may be utilized in a variety of industries and applications including, but not limited to, regulated markets such as financial services datasets including credit lending applications, AI-based government response to COVID, and/or healthcare insurance contexts where responsible practices may be tested given the sensitive nature of these services and engagements. Systems and methods according to embodiments of the present disclosure also may be utilized in non-regulated domains including, but not limited to, retail and consumer goods manufacturing. Systems and methods according to embodiments of the present disclosure may deploy APIs to detect, mitigate, and reduce bias in AI, establish AI governance policies for responsible AI practices, and implement use case-specific implementations to detect issues in responsible AI.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

We claim:

1. An end-to-end method for responsible artificial intelligence (AI) using a platform implemented on one or more hardware computer processors and one or more storage devices, the method comprising:
   in a data privacy step, inputting data in an input database capable of receiving data;
   in a data bias step, using a data bias system configured to execute code, conducting exploratory data analysis (EDA), pre-processing to identify missing or incomplete records, outliers and anomalies, and/or perform feature engineering and selection on the data;
   in an explainable artificial intelligence (XAI) and privacy step, using a model development system configured to execute code, developing a model through XAI and privacy;
   in a model bias and privacy step, using the model development system, evaluating and selecting the model for bias and privacy;
   evaluating prediction bias of the model;
   deploying the model; and
   following deployment, using a unified model monitoring platform (UMMP) comprising a model deployment layer; a gateway layer that provides access to the data through an application programming interface (API) or an event stream; a risk analysis index (RAI) services layer including a plurality of independent microservices; a RAI APIs layer that provides access to the RAI services layer to extract RAI details for the model, generate a model benchmark report, subscribe to violation notifications, and get the model in production; and a RAI user interface layer that provides a browser-based interface and includes at least an RAI dashboard, report generation, monitoring, and administration, monitoring the model to evaluate bias, XAI, and drifts.

2. The method of claim 1 further comprising:
   in a model accountability step, managing the model before deployment.

3. The method of claim 1, wherein following the monitoring step, selectively returning to the defining or data bias step to further refine the model.

4. The method of claim 1, the data bias step further comprising
   selecting one or more sensitive features;
   conducting bias measurement; and
   if bias is detected, performing data debiasing.

5. The method of claim 4, the evaluating prediction bias of the model step further comprising:
   selecting one or more sensitive features;
   conducting model debiasing; and
   measuring bias.

6. The method of claim 5, wherein the model debiasing step occurs following in-processing or post-processing.

7. The method of claim 4, the monitoring step further comprising:
   evaluating if bias is detected; and
   if no bias is detected in the evaluating step, confirming model privacy, resulting in a fair and secure model.

8. The method of claim 7, wherein model privacy is confirmed through one or more of the following:
   bias and fairness drift, model monitoring, data drift, and/or model drift.

* * * * *